J. B. BLEOO.
HITCH AND DRAWBAR ATTACHMENT.
APPLICATION FILED AUG. 8, 1921.
1,412,834.
Patented Apr. 18, 1922.
3 SHEETS—SHEET 1.
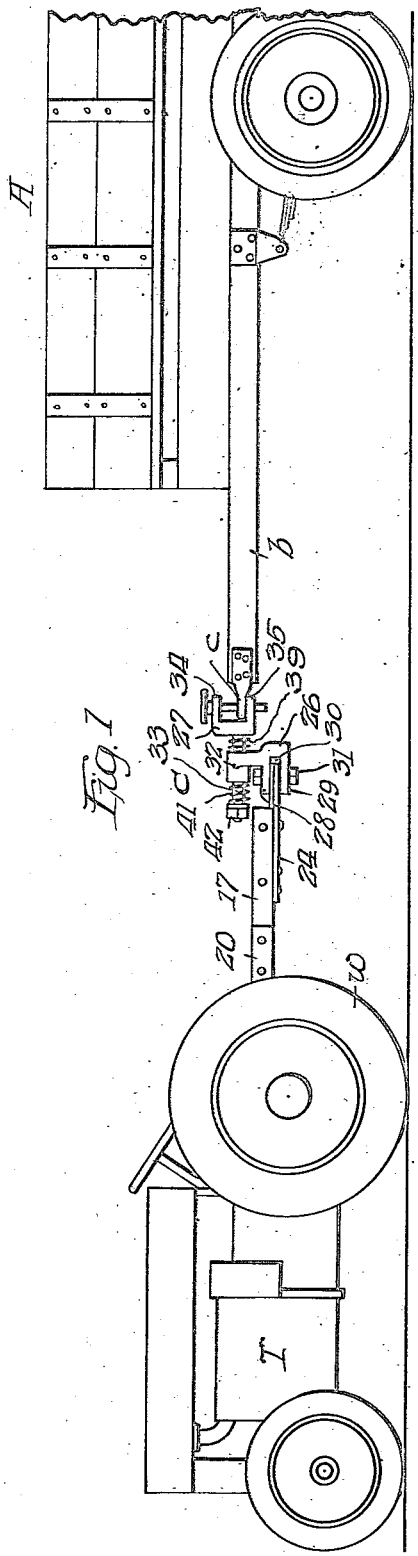
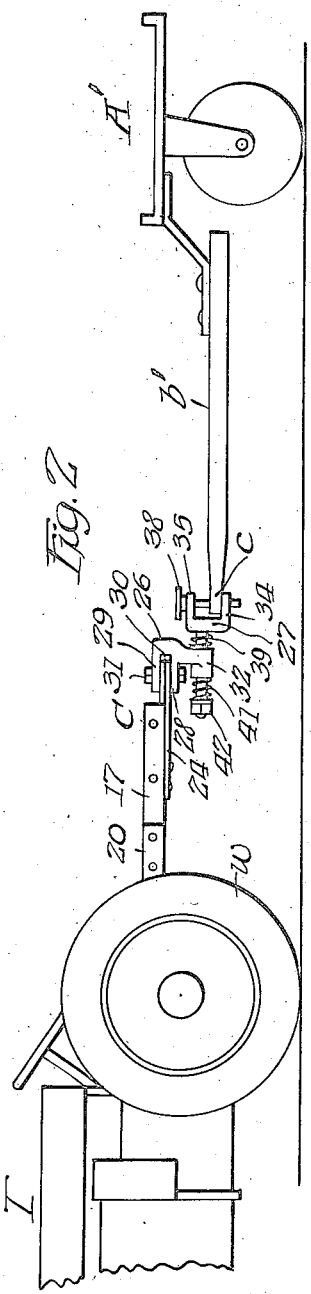
Inventor:
John B. Bleoo,
By
Atty.

J. B. BLEOO.
HITCH AND DRAWBAR ATTACHMENT.
APPLICATION FILED AUG. 8, 1921.
1,412,834.
Patented Apr. 18, 1922.
3 SHEETS—SHEET 2.
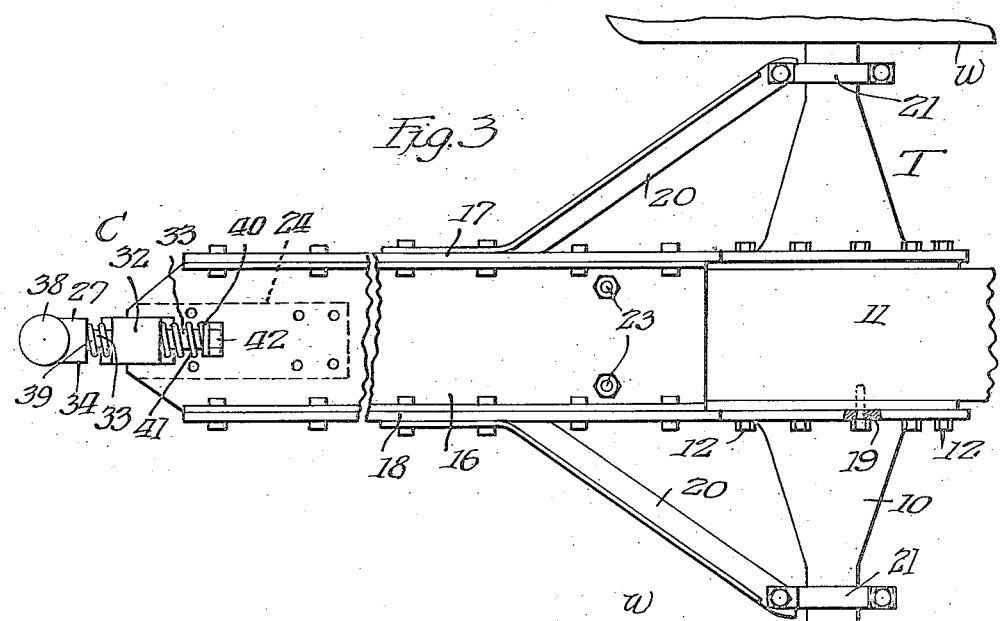
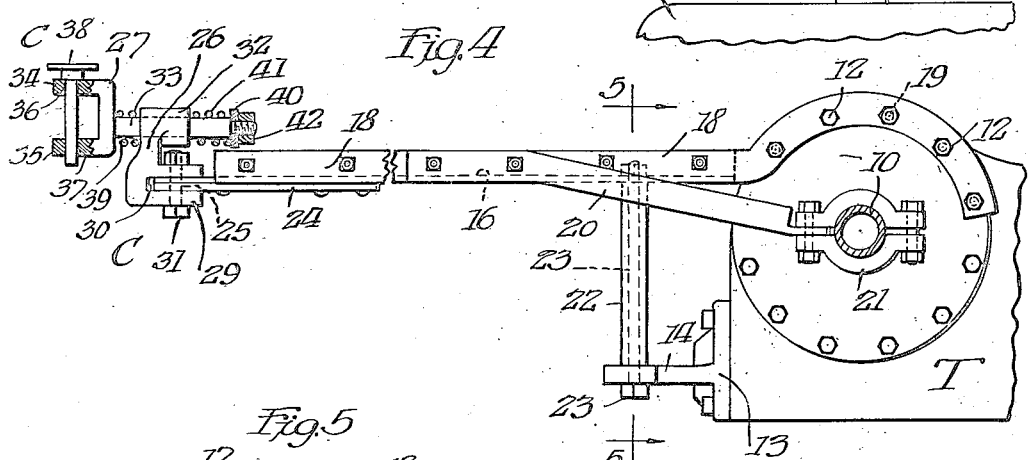
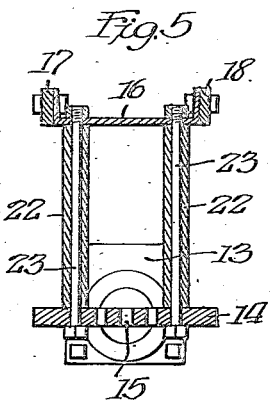
Inventor:
John B. Bleoo,
By Geo. S. Imes,
atty.

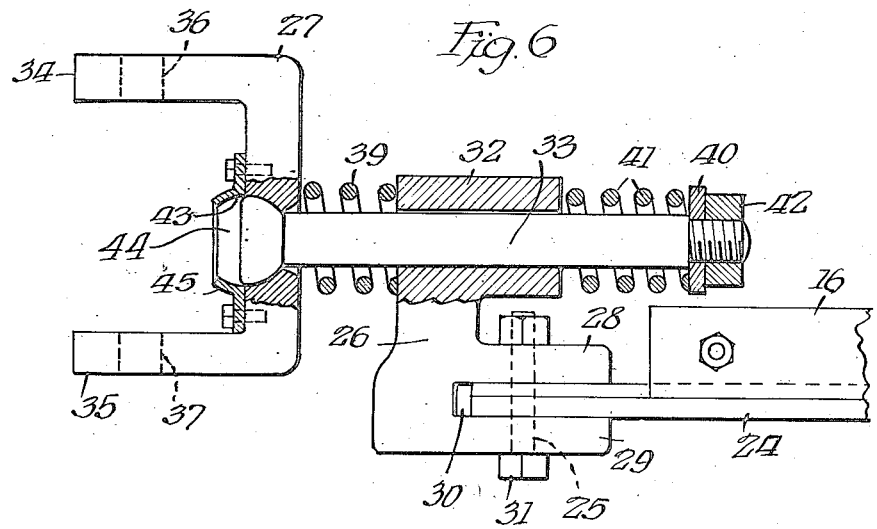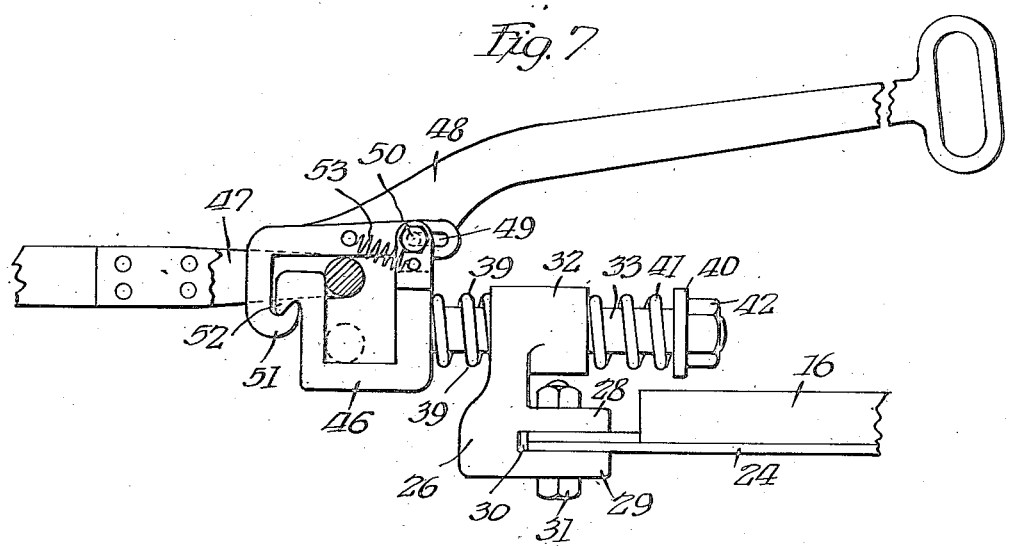

UNITED STATES PATENT OFFICE.

JOHN B. BLEOO, OF CHICAGO, ILLINOIS.

HITCH AND DRAWBAR ATTACHMENT.

1,412,834.    Specification of Letters Patent.    Patented Apr. 18, 1922.

Application filed August 8, 1921. Serial No. 490,555.

*To all whom it may concern:*

Be it known that I, JOHN B. BLEOO, a citizen of the United States, and a resident of Chicago, in the county of Cook and State of Illinois, have invented certain new and useful Improvements in Hitch and Drawbar Attachments, of which the following is a specification.

My invention relates to an improved draw bar attachment, which is particularly adaptable for attachment to tractors.

In tractors as now constructed, a draw bar cap is secured on the back of the rear axle housing, which cap has a horizontal flange provided with a series of holes for receiving a king bolt by which the tongues of vehicles or machines to be drawn are attached. With this arrangement, it is impossible to always obtain such draw bar connection between the tractor and trailer as will insure only a horizontal pulling effort without either a vertical component of pressure or raising effort on the tractor driving axle. If the connection at the trailer is lower than the draw bar cap on the tractor a pressure component will be exerted on the tractor driving axle tending to force the tractor wheels into the ground. Where the connection at the trailer is higher than the draw bar cap, a lifting component will be manifested at the tractor axle which will tend to reduce the traction of the tractor wheels. The main object of my invention is therefore, to provide an adjustable draw bar attachment for tractors by means of which draw bar attachments can be made with vehicles or machines to be drawn regardless of the height of the tongues on such trailers or machines so that only a horizontal pull effort will be manifested at the tractor driving axle, and any vertical component of pressure or lifting effort will be eliminated, the tractors being thus permitted to operate at their greatest traction efficiency at all times. My improved attachment is complete in itself, and can be readily attached to the tractor without requiring any changes in construction on the tractor.

My improved attachment and its application and operation are illustrated on the accompanying drawings in which—

Fig. 1 is a side elevational view of a tractor and trailer together with the draw bar attachment, Fig. 2 is a side elevational view showing the tractor, and the draw bar attachment adjusted for pulling a machine such as a disking machine.

Fig. 3 is an enlarged plan view of the rear axle of the tractor and the draw bar attachment, Fig. 4 is a side elevational view of the draw bar attachment, Fig. 5, is a sectional view on plane 5—5, Fig. 4, Fig. 6 is a side elevational view of the outer end of the draw bar attachment showing a modified arrangement, and Fig. 7 is a side elevational view showing another modified arrangement.

On the drawing, T represents the tractor which has the rear axle housing 10 and the gear case 11 secured to the housing by the bolts 12. To the rear end of the housing and below the axle center is secured the draw bar cap 13 which has the horizontal flange 14 provided with a series of holes 15 for receiving the king bolt which connects the tongue of a trailer with the tractor, this being the arrangement provided for tractors as at present constructed. With this arrangement, it is of course evident that it will be impossible to obtain at all times a direct horizontal draw bar pull between tractor and trailer without either a vertical component of either pressure or lifting effort at the tractor rear axle.

Describing now my improved draw bar attachment, which overcomes these objections, it is shown comprising a channel beam 16 whose sides are bolted to the bars 17 and 18 which at their rear ends project beyond the beam, and are curved to semi-circular form and are provided with bolt holes 19 which are spaced to register with the bolt holes of the bolts 12 which secure the gear case 11 to the axle housing 10. The curved ends of the bars are spaced apart to receive between them the gear case after a series of the bolts 12 have been removed. The bolt holes 19 are then brought into register with the holes of the bolts 12, and then the bolts 12 are reapplied, the draw bar attachment being then rigidly bolted to the gear casing. To increase the rigidity of connection, brace bars 20 are secured to the sides of beam 16 and at their inner ends are secured to the fittings 21 which are clamped on the axle housing 10 adjacent to the wheels W. The connection is such that the beam 16 extends horizontally, and between the beam and the draw bar cap flange 14 are interposed struts 22 in the form of pipes which are held in place by bolts 23 extending therethrough and through the beam 16 and holes 15 at the flange 14. Preferably two sets are provided and engaged with beam 16 adjacent its sides as clearly shown in Figure 5. The bolted connection of the curved ends of the attachment with the gear casing, together with the braces 20 and the struts 23 provide a very rigid connection for the draw bar attachment.

At its outer end the web of the channel beam 16 extends a distance beyond the channel flanges and a strengthening plate 24 is secured to the web, the bolt holes 25 extending through the web and plate. Between the end of the beam structure and the tongue of the vehicle to be drawn is interposed an adjustable coupling C. This coupling mechanism comprises the fitting 26, and the fitting 27. The fitting 26 has the extensions 28 and 29 between which is the slot 30 for receiving the projecting beam web and the strengthening plate, bolt 31 passing through the extensions and the bolt holes 25 to detachably connect the fitting to the beam structure. Above the extensions 28 and 29 the fitting 26 has a sleeve 32 for receiving the cylindrical stem 33 forming part of the fitting 27. The walls 34 and 35 extend from the fitting 27 in a direction opposite to that in which stem 33 extends, and these walls are spaced apart and have the holes 36 and 37 for receiving the king bolt 38. On the stem 33 between the fitting 27 and sleeve 32 is the compression bumper spring 39, and on the stem between the sleeve and the washer 40 is the bumper spring 41, the nut 42 engaging the threaded end of the stem and holding the washer in place. The stem 33 is thus readily slidable in the sleeve 32 against the compression of the springs. The stem is also rotatable in the sleeve so that the fitting 27 may be turned on a horizontal axis. The wall 34 of the fitting is at a greater distance from the stem axis than the wall 35, so that the space between the walls can be adjusted with reference to the beam 16 by turning the fitting 27. The fitting 26 may be applied to the beam 16 with the sleeve 41 above or below the beam as desired depending upon the height of the trailer vehicle or machine to be drawn. Referring to Figure 1 the tractor is shown coupled to a trailer A whose tongue b when in horizontal position is higher than the draw bar beam 16. For efficient draw connection in this case the fitting 26 is applied to beam 16 with the sleeve 32 above the beam, and the fitting 27 is turned to bring the wall 34 uppermost. The loop or eye fitting c at the end of the trailer tongue is then inserted in the fitting 27 and the king bolt 38 is applied. There will now be direct horizontal draw bar pull between the tractor and trailer, with all vertical component pressure or lifting effort on the tractor axle eliminated, and the extended space between walls 34 and 35 of the fitting 27 permits ample clearance so that binding will be prevented while the train travels over uneven ground. During travel, the springs 39 and 41 will act as shock absorbers and eliminate jolting and jarring strains between the tractor and trailer.

In Fig. 2 a disking machine A' is shown coupled to the tractor. On this machine the tongue b' is some distance below the horizontal line of the draw bar beam 16, and the fitting 26 is therefore turned to bring the sleeve 32 below the beam, and the fitting 27 is turned to bring the farthest removed wall 34 down. When the tongue b' is then connected to the fitting 27 by means of the king bolt 38 the draw bar pull between the vehicles will be horizontal, and there will be no vertical component of pressure or lifting element on the tractor rear axle. Thus by reversing the fitting 26 and turning the fitting 27 the most suitable coupling arrangement can be provided between the tractor and vehicle or machine to be drawn. During travel of the train over uneven or rough ground, there will be no strain, for the coupling is extremely flexible. The fitting 26 can turn horizontally on the draw bar beam, the fitting 27 can turn relatively to the fitting 26 and shift longitudinally against the bumper springs, while the trailer tongue connection with fitting 27 permits sufficient clearance to prevent binding.

Referring to Fig. 6, additional flexibility can be provided for by a pivoted connection between the body of the fitting 27 and its stem 33. As shown the yoke of the fitting body has the socket 43 for receiving the semi-spherical head 44 at the outer end of the stem 33. A cap 45 secured on the inner side of the yoke of fitting 27 has the socket 43', which forms a continuation of the socket 43. The fitting 45 also prevents escape of the head 44 from the socket. The ball and socket joint or any form of universal joint adds greatly to the flexibility of the coupling connection so that the tractor and trailer are at all times free to move relatively without being strained.

In Fig. 7 I show another modified arrangement, in which the body 45 of the fitting 27 is U-shape to form a hook for receiving the eye or loop 47 at the end of the tongue or the vehicle such as a dump cart. Pivoted on the end of the inner limb of the U frame is a lever 48, the lever having the slot 49 receiving the pivot bolt 50. The outer end of the lever deflects downwardly to form a locking hook 51 for engaging with the hook 52 on the outer limb of the U frame. A spring 53 connecting between the inner limb of the U frame and the outer end of the lever tends to shift the lever inwardly with the outer end of the slot against the bolt to hold the hooks in locking engagement so that the tongue of the dump cart cannot escape. The lever at its outer end extends within range of the operator on the tractor, and when he desires to dump the contents of the cart he shifts the lever rearwardly and swings it downwardly so as to disconnect the hooks 51 and 52 and permit the eye 47 to leave the U frame, the cart then automatically dumping itself.

I thus provide a very efficient draw bar attachment for tractors which can be efficiently used for connecting practically any type of vehicle or farm implements with the tractor. Owing to its adjustability and extreme flexibility, direct horizontal pull between the vehicle is assured with the elimination of vertical pressure or raising effort on the tractor driving axle. No structural changes are necessary on the tractors, and the attachment can be applied by merely withdrawing a few bolts and reapplying them and fastening the braces and struts to the respective tractor parts.

A strong, rigid draw bar beam structure 16 which extends a considerable distance rearwardly of the tractor also serves another very useful purpose. It has been found that when the rear wheels of the tractor are obstructed during driving of the tractor, there is sometimes a tendency for the front of the tractor to rise, and in many cases the tractor will tip over backwards. By having on the rigid draw bar beam extension this tipping will be prevented as the beam will engage with the ground before the tractor can assume any dangerous angle.

I do not desire to be limited to the exact construction, arrangement and operation described as changes may readily be made which would be within the scope of my invention.

I claim as follows:

1. In draw bar mechanism, the combination of a beam, means for rigidly connecting the beam at one end with a vehicle axle near the center of the axle, braces extending from said beam and connecting with the axle near the outer end thereof, strut mechanism for connecting between said beam and the vehicle and coupling mechanism at the other end of said beam.

2. In draw bar mechanism, the combination of a beam, hook arms at one end of said beam for adapting said beam to be secured to a vehicle axle structure at the center thereof, braces extending from said beam and adapted for connection with the axle structure near the ends thereof, vertical struts below said beam and means for connecting them with the vehicle and coupling mechanism at the other end of said beam.

3. In combination with a tractor having a rear axle housing and a gear case, gear case sides, and bolts for securing said sides of a draw bar attachment, said attachment comprising a beam, arms extending from said beam and having semicircular projecting ends, bolt holes through said projecting ends spaced to register with the bolt holes of the bolts securing the gear casing whereby the gear casing bolts may be withdrawn and the arm extensions secured in common with the gear casing, and coupling mechanism at the outer end of said beam.

4. In combination with a tractor having a rear axle housing, a gear case, and bolts circularly arranged to secure said gear case to the housing, of a draw bar attachment, said attachment comprising a beam, curved arms extending from the rear end of said beam and having bolt holes spaced to register with the bolt holes of the gear case whereby said arms may be secured to the gear case by the same bolt that secures the gear case to the housing, brace members extending from said beam, means for detachably securing said brace members to the axle housing near the outer ends thereof, and coupling mechanism at the outer end of said beam.

5. In combination with a tractor having a rear axle housing, a gear case, and bolts securing said gear case to the housing, of a draw bar attachment, said attachment comprising a beam, curved arms extending from said beam and provided with bolt holes spaced to register with the bolt holes of the casing whereby the casing bolts may be used to secure the arms to the housing in common with the casing, brace members secured to the beam at their outer ends, means for detachably securing said brace members at their inner ends to the axle members at the outer end thereof, a bracket on said axle housing, struts extending upwardly from said bracket and engaging with said beam in front of the axle housing and coupling mechanism at the outer end of said beam.

In witness whereof, I hereunto subscribe my name this 3rd day of August, A. D., 1921.

JOHN B. BLEOO.